(12) United States Patent
Chen et al.

(10) Patent No.: US 10,739,667 B2
(45) Date of Patent: Aug. 11, 2020

(54) PROJECTOR, OPTICAL ENGINE, AND PIXEL OFFSET DEVICE

(71) Applicant: Coretronic Corporation, Hsin-Chu (TW)

(72) Inventors: Wei-Hao Chen, Hsin-Chu (TW); Chun-Hsin Lu, Hsinchu (TW); Tsung-Hsin Liao, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/015,215

(22) Filed: Jun. 22, 2018

(65) Prior Publication Data

US 2019/0235364 A1 Aug. 1, 2019

(30) Foreign Application Priority Data

Jan. 26, 2018 (CN) .......................... 2018 1 0077906

(51) Int. Cl.
  *G03B 21/14* (2006.01)
  *G03B 21/16* (2006.01)
  *H04N 9/31* (2006.01)
(52) U.S. Cl.
  CPC ......... *G03B 21/142* (2013.01); *G03B 21/147* (2013.01); *G03B 21/16* (2013.01); *H04N 9/3188* (2013.01); *G03B 2205/0053* (2013.01)
(58) Field of Classification Search
  CPC .. H04N 9/3111; H04N 9/3117; H04N 9/3114; H04N 9/315; H04N 9/3188; G09G 2310/0235; G09G 3/007; G03B 21/16; G03B 21/142; G03B 2205/0053
  See application file for complete search history.

(56) References Cited

U.S. PATENT DOCUMENTS

| 5,784,038 A * | 7/1998 | Irwin | H04N 9/3114 345/32 |
| 6,520,648 B2 * | 2/2003 | Stark | H04N 9/3114 348/743 |
| 6,984,040 B2 * | 1/2006 | Childers | G09G 3/007 348/743 |

(Continued)

FOREIGN PATENT DOCUMENTS

| CN | 1868217 | 11/2006 |
| CN | 101539713 | 10/2010 |
| TW | I243276 | 11/2005 |

*Primary Examiner* — Bao-Luan Q Le
(74) *Attorney, Agent, or Firm* — JCIPRNET

(57) ABSTRACT

A projector includes a light source module and an optical engine. The light source module provides an illumination beam. The optical engine includes a light valve, a projection lens, and a pixel offset device. The light valve has an active surface, and the active surface converts the illumination beam into an image beam and reflects the image beam. The projection lens projects the image beam from the projector. The pixel offset device is located between the light valve and the projection lens and includes a frame and a transparent panel, the transparent panel is disposed in the frame and includes a transparent surface, the transparent panel is disposed on the transmission path of the illumination beam and the transmission path of the image beam, the frame is configured to drive the transparent panel to vibrate, and the transparent surface is tilted with respect to the active surface.

5 Claims, 8 Drawing Sheets

(56) References Cited

U.S. PATENT DOCUMENTS

| | | | | |
|---|---|---|---|---|
| 7,052,142 B2* | 5/2006 | Gupta | G03B 21/20 | 348/E5.137 |
| 7,086,736 B2* | 8/2006 | Collins | G09G 3/007 | 348/743 |
| 7,182,463 B2* | 2/2007 | Conner | H04N 9/3188 | 348/E9.027 |
| 7,202,917 B2* | 4/2007 | Katoh | H04N 9/3111 | 348/742 |
| 7,267,442 B2* | 9/2007 | Childers | H04N 9/3111 | 348/792 |
| 7,270,417 B2* | 9/2007 | Choi | G02B 26/0875 | 348/745 |
| 7,290,884 B2* | 11/2007 | Choi | G02B 26/0875 | 348/745 |
| 7,300,157 B2* | 11/2007 | Conner | H04N 9/3188 | 348/E9.027 |
| 7,425,074 B2* | 9/2008 | Kang | H04N 9/3188 | 353/121 |
| 7,477,799 B2* | 1/2009 | Chang | H04N 5/7458 | 348/E5.142 |
| 7,600,874 B2* | 10/2009 | Childers | H04N 9/3117 | 348/742 |
| 7,762,669 B2* | 7/2010 | Choi | H04N 9/3179 | 348/771 |
| 7,810,932 B2* | 10/2010 | Hong | H04N 9/3141 | 353/121 |
| 8,016,429 B2* | 9/2011 | Chang | H04N 9/315 | 348/771 |
| 8,480,239 B2* | 7/2013 | Sato | G02B 27/283 | 345/9 |
| 8,531,615 B2* | 9/2013 | Sato | G03B 21/145 | 349/5 |
| 8,814,365 B2* | 8/2014 | Iwane | H04N 9/3144 | 353/85 |
| 8,888,291 B2* | 11/2014 | Aikoh | G03B 21/2073 | 353/20 |
| 9,619,867 B2* | 4/2017 | Kruglick | H04N 9/3129 | |
| 2002/0140910 A1* | 10/2002 | Stark | H04N 9/3114 | 353/84 |
| 2003/0090597 A1* | 5/2003 | Katoh | H04N 9/3111 | 348/744 |
| 2005/0128438 A1* | 6/2005 | Kang | H04N 9/3141 | 353/69 |
| 2005/0128443 A1* | 6/2005 | Kang | H04N 9/3141 | 353/122 |
| 2005/0134805 A1* | 6/2005 | Conner | H04N 9/3188 | 353/46 |
| 2005/0157272 A1* | 7/2005 | Childers | G09G 3/007 | 353/84 |
| 2005/0162617 A1* | 7/2005 | Koo | H04N 9/3141 | 353/46 |
| 2005/0243290 A1* | 11/2005 | Gupta | G03B 21/20 | 353/99 |
| 2005/0264501 A1* | 12/2005 | Choi | G02B 27/0933 | 345/84 |
| 2005/0275810 A1* | 12/2005 | Choi | G02B 26/0875 | 353/69 |
| 2006/0007057 A1* | 1/2006 | Choi | G02B 26/0875 | 345/9 |
| 2006/0082562 A1* | 4/2006 | Childers | H04N 9/3111 | 345/204 |
| 2006/0140511 A1* | 6/2006 | Chang | H04N 5/7458 | 382/298 |
| 2006/0279702 A1* | 12/2006 | Kettle | G03B 21/14 | 353/20 |
| 2006/0290824 A1* | 12/2006 | Hong | H04N 5/74 | 348/739 |
| 2007/0268459 A1* | 11/2007 | Childers | H04N 9/3111 | 353/31 |
| 2007/0273955 A1* | 11/2007 | Chang | G02B 26/10 | 359/292 |
| 2009/0027623 A1* | 1/2009 | Kawamura | H04N 9/3105 | 353/31 |
| 2011/0249205 A1* | 10/2011 | Sato | G03B 21/16 | 349/5 |
| 2011/0261325 A1* | 10/2011 | Sato | G02B 27/283 | 353/20 |
| 2011/0292353 A1* | 12/2011 | Iwane | H04N 9/3144 | 353/85 |
| 2016/0132994 A1* | 5/2016 | Kruglick | H04N 9/3129 | 345/589 |
| 2016/0349604 A1* | 12/2016 | Okuno | G03B 21/16 | |

* cited by examiner

PROJECTOR, OPTICAL ENGINE, AND PIXEL OFFSET DEVICE

CROSS-REFERENCE TO RELATED APPLICATION

This application claims the priority benefit of China application serial no. 201810077906.1, filed on Jan. 26, 2018. The entirety of the above-mentioned patent application is hereby incorporated by reference herein and made a part of this specification.

BACKGROUND OF THE INVENTION

Field of the Invention

The invention relates to an optical device and a component thereof, and more particularly, to a projector, an optical engine, and a pixel offset device.

Description of Related Art

The projector is a display device for generating a large screen. The imaging principle of a projector includes converting an illumination beam generated by a light source into an image beam via a light valve, and then projecting the image beam on a screen or a wall via a projection lens.

To increase the pixel quality (image resolution) of the projection image, a pixel offset device is disposed between the light valve and the projection lens of some projectors, and the pixels are suitable offset back and forth via the vibration of the pixel offset device. In the case of a non-telecentric optical system projector, the light generated by the light source module thereof reaches the light valve after passing through the pixel offset device, and after being reflected by the light valve, the light passes through the pixel offset device again and is transmitted toward the projection lens. Under such design method, a portion of the light generated by the light source module is directly reflected by the pixel offset device and enters the projection lens, and is projected via the projection lens as a stray light, thus affecting image quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projector, an optical engine, and a pixel offset device that can prevent the generation of stray light.

Other objects and advantages of the invention can be further understood from the technical features disclosed in the invention.

To achieve one or some or all of the objects above or other objects, an embodiment of the invention provides a projector including a light source module and an optical engine. The light source module is configured to provide an illumination beam, and the optical engine includes a light valve, a projection lens, and a pixel offset device. The light valve is disposed on a transmission path of the illumination beam, wherein the light valve has an active surface, and the active surface is configured to convert the illumination beam into an image beam and reflect the image beam. The projection lens is disposed on the transmission path of the image beam and is configured to project the image beam from the projector. The pixel offset device is located between the light valve and the projection lens, wherein the pixel offset device includes a frame and a transparent panel, the transparent panel includes a transparent surface, the frame has at least one carrying surface, the carrying surface of the frame carries at least a portion of the periphery of the transparent panel, the carrying surface is tilted with respect to the active surface such that the transparent surface is tilted with respect to the active surface, the transparent panel is disposed on the transmission path of the illumination beam and the transmission path of the image beam, and the frame is configured to drive the transparent panel to vibrate.

An optical engine configured for a projector is provided. The projector includes a light source module. The light source module is configured to provide an illumination beam, and the optical engine includes a light valve, a projection lens, and a pixel offset device. The light valve is disposed on a transmission path of the illumination beam, wherein the light valve has an active surface, and the active surface is configured to convert the illumination beam into an image beam and reflect the image beam. The projection lens is disposed on the transmission path of the image beam and is configured to project the image beam from the projector. The pixel offset device is located between the light valve and the projection lens, wherein the pixel offset device includes a frame and a transparent panel, the transparent panel is disposed in the frame and includes a transparent surface, the frame has at least one carrying surface, the carrying surface of the frame carries at least a portion of the periphery of the transparent panel, the carrying surface is tilted with respect to the active surface such that the transparent surface is tilted with respect to the active surface, the transparent panel is disposed on the transmission path of the illumination beam and the transmission path of the image beam, and the frame is configured to drive the transparent panel to vibrate.

A pixel offset device configured for a projector is provided. The pixel offset device includes a frame and a transparent panel. The frame includes a positioning surface and at least one carrying surface. The transparent panel includes a transparent surface, the carrying surface of the frame carries at least a portion of the periphery of the transparent panel, and the carrying surface is tilted to the positioning surface such that the transparent surface is tilted with respect to the positioning surface, wherein the frame is configured to drive the transparent panel to vibrate.

Based on the above, the embodiments of the invention have at least one of the following advantages or efficacies. The transparent surface of the transparent panel of the pixel offset device is tilted with respect to the active surface of the light valve, and therefore when a portion of the illumination beam from the light source module is reflected by the transparent surface of the transparent panel, the reflected illumination beam is not transmitted toward the projection lens to prevent the generation of stray light.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
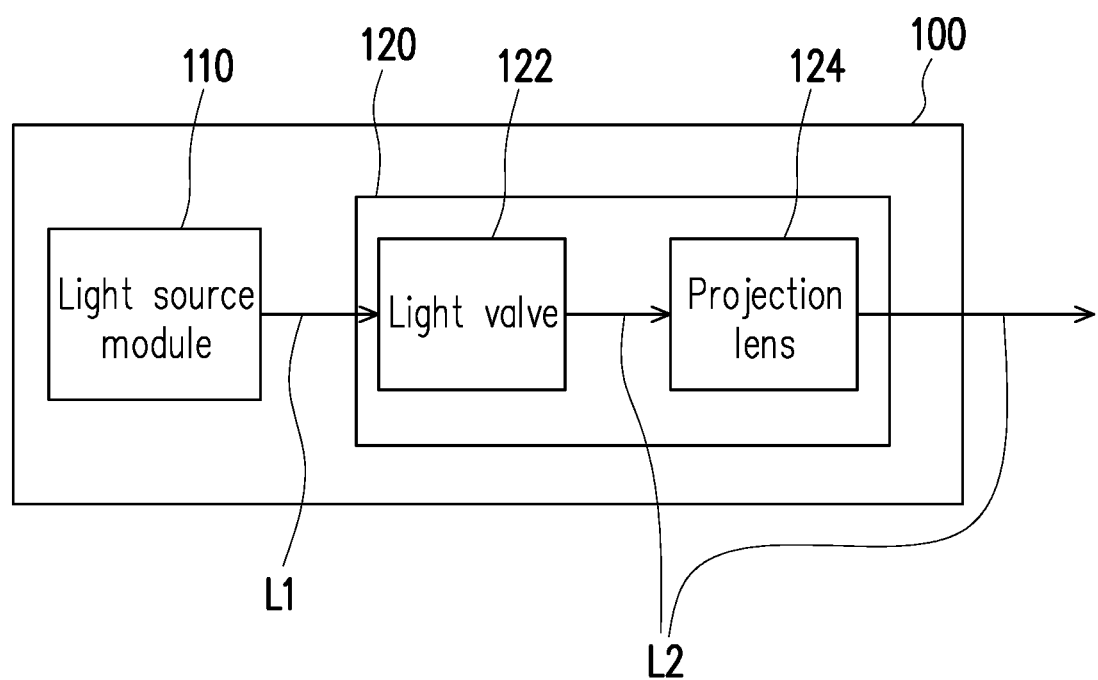
FIG. 1 is a schematic of a projector of an embodiment of the invention.

FIG. 1 is a schematic of a projector of an embodiment of the invention. Referring to FIG. 1, a projector 100 of the embodiment includes a light source module 110 and an optical engine 120, and the optical engine 120 includes a light valve 122 and a projection lens 124. The light source module 110 is configured to provide an illumination beam L1 and the illumination beam L1 is guided to the light valve 122. The light valve 122 is, for instance, a digital micromirror device (DMD) disposed on the transmission path of the illumination beam L1 and configured to convert the illumination beam L1 into an image beam L2, and the light valve 122 reflects the image beam L2 to the projection lens 124. The projection lens 124 is disposed on the transmission path of the image beam L2 and is configured to project the image beam L2 from the projector 100.

Figure 2:
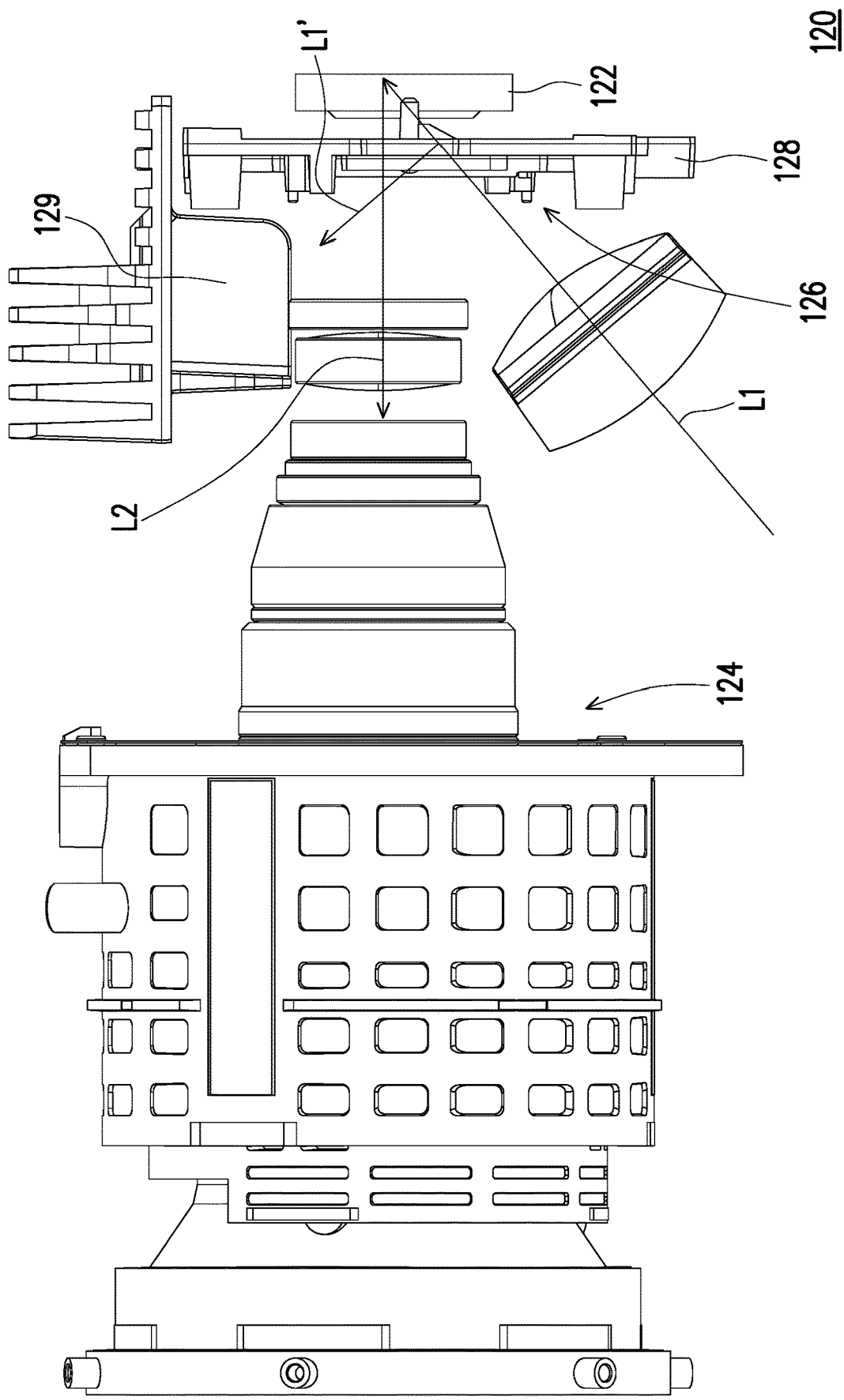
FIG. 2 is a side view of a portion of the components of the optical engine of FIG. 1.
Figure 3:
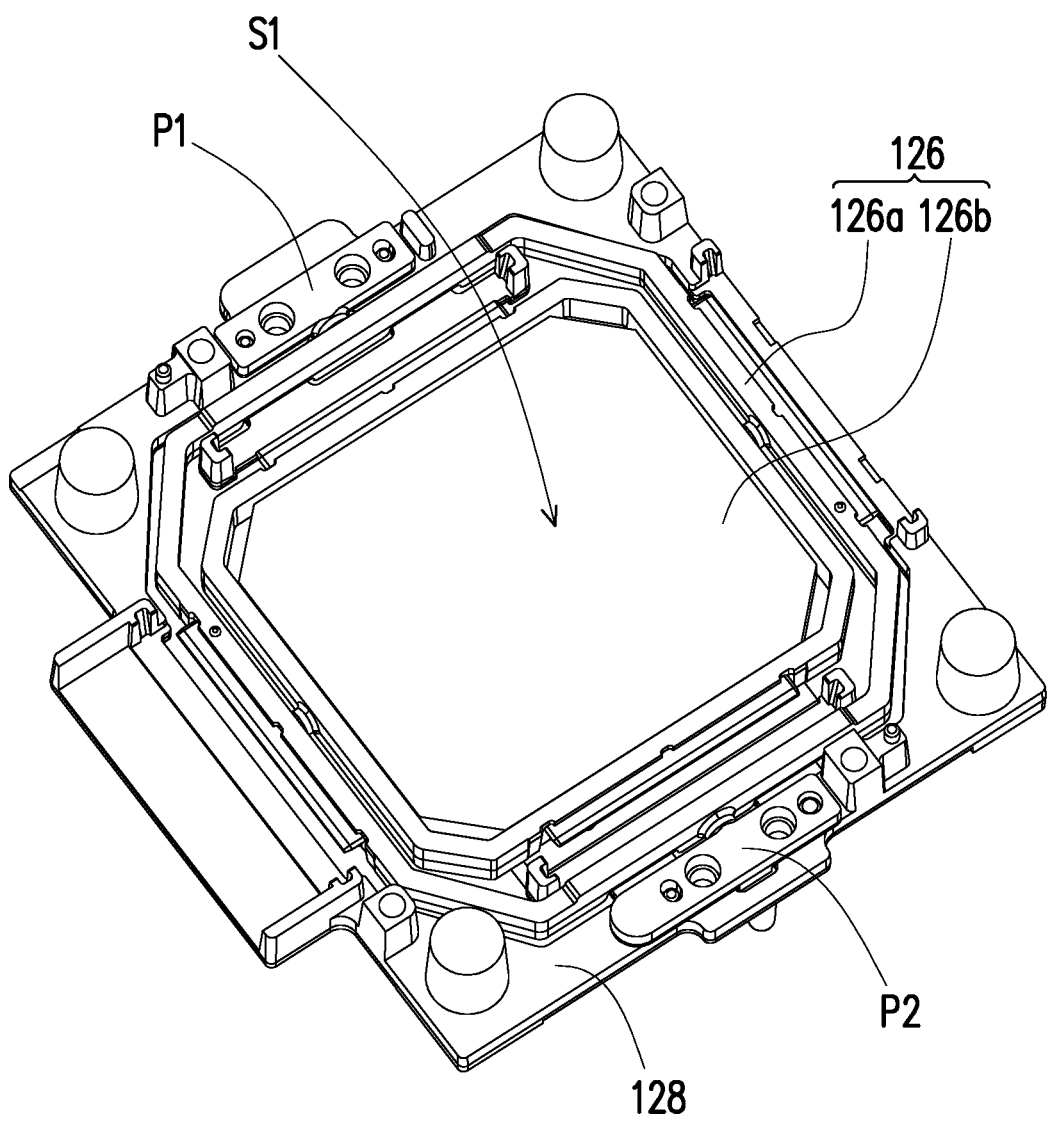
FIG. 3 is a three-dimensional view of the pixel offset device and base of FIG. 2.
Figure 4:
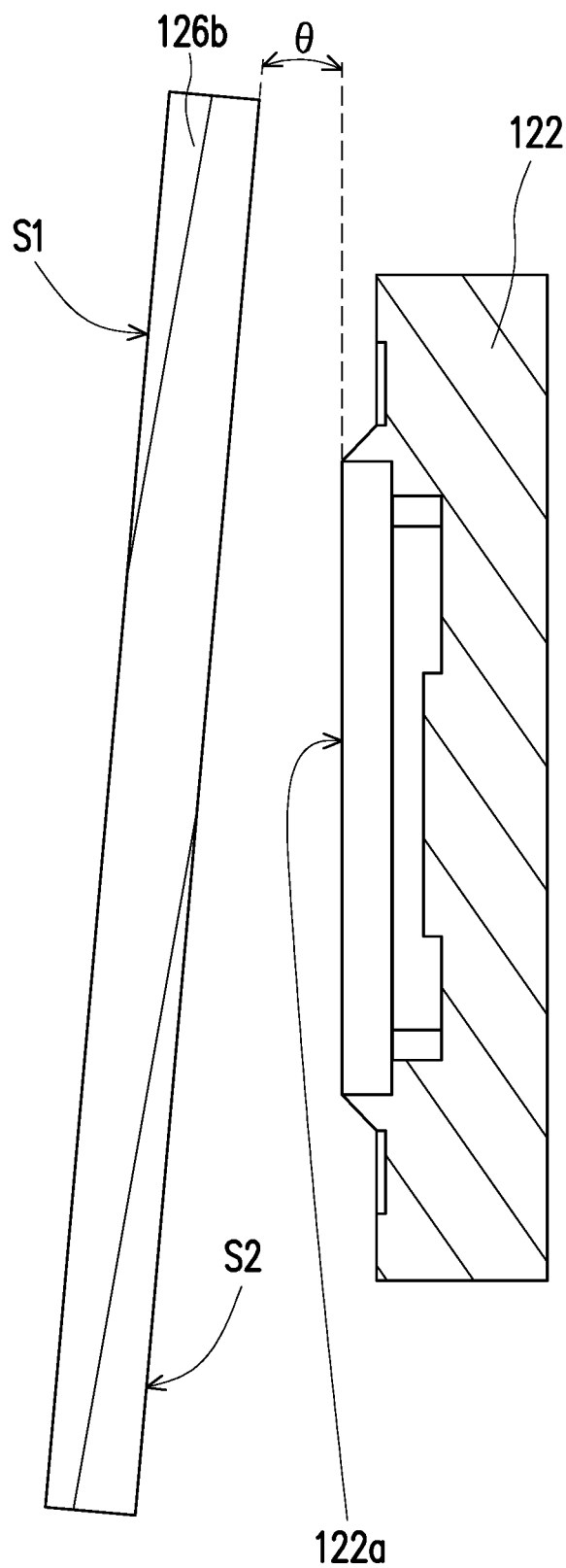
FIG. 4 shows the relationship between the light valve of FIG. 2 and the transparent panel of FIG. 3.

FIG. 2 is a side view of a portion of the components of the optical engine of FIG. 1. FIG. 3 is a three-dimensional view of the pixel offset device and base of FIG. 2. FIG. 4 shows the relationship between the light valve of FIG. 2 and the transparent panel of FIG. 3. Referring to FIG. 2 to FIG. 4, the projector 100 of the embodiment is, for instance, a non-telecentric optical system, the optical engine 120 further includes a pixel offset device 126 and a base 128, the base 128 is, for instance, a portion of the base or the shell of the optical engine 120, the pixel offset device 126 is disposed on the base 128 and located between the light valve 122 and the projection lens 124 and configured to receive the image beam L2 from the light valve 122, and the pixel offset device 126 is configured to vibrate slightly back and forth such that offset occurs to the pixels of the projected screen.

Specifically, the light valve 122 has an active surface 122a as shown in FIG. 4, and the active surface 122a is configured to modulate the illumination beam L1 shown in FIG. 1 and FIG. 2 and convert the illumination beam L1 into the image beam L2 and reflect the image beam L2. The active surface 122a is, for instance, rectangular and formed by the reflective array of a plurality of digital micro mirror elements (not shown), and the micro mirror elements can convert the illumination beam L1 incident on the micro mirror elements into the image beam L2 and reflect the image beam L2 to the projection lens 124 by controlling the deflection angle and deflection time of the reflector of each of the micro mirror elements. The pixel offset device 126 includes a frame 126a and a transparent panel 126b, the frame 126a is disposed on the base 128, and the transparent panel 126b is, for instance, a flat glass and disposed in the frame 126a and located on the transmission path of the illumination beam L1 and the transmission path of the image beam L2. Since the pixel offset device 126 is disposed in front of the light valve 122, the illumination beam L first obliquely passes through the transparent panel 126b of the pixel offset device 126 via a condenser lens (not labeled), and then is incident on the light valve 122. The image beam L2 converted by the light valve 122 passes through the transparent panel 126b of the pixel offset device 126 and the projection lens 124 in order. The frame 126a can be driven by a suitable actuator (not shown) to vibrate slightly back and forth via a pivot shaft to drive the transparent panel 126b to vibrate slightly back and forth such that the transmission direction of the image beam L2 is rapidly offset back and forth at a small angle. As a result, offset occurs to the pixels of the screen projected from the projection lens 124 (as shown in FIG. 1) and image overlap is achieved via a persistence of vision effect, such that the function of increasing screen resolution is achieved. The pixel offset device 126 has a vibration state and a stationary state, wherein when the frame 126a is driven by an actuator, the pixel offset device 126 is in vibration state, and when the frame 126a is not driven by the actuator, the pixel offset device 126 is in a stationary state.

As shown in FIG. 2 to FIG. 4, the transparent panel 126b is disposed in the frame 126a and includes a transparent surface S1 and a transparent surface S2. The transparent surface S1 and the transparent surface S2 of the embodiment are, for instance, two planes opposite to each other and parallel to each other. A portion of the illumination beam L1 passes through the transparent surfaces S1 and S2 in order and is then transmitted to the light valve 122 and converted by the active surface 122a of the light valve 122 into the image beam L2. After the image beam L2 is reflected by the active surface 122a of the light valve 122, the image beam L2 passes through the transparent surfaces S2 and S1 in order and is transmitted to the projection lens 124. The transparent surfaces S1 and S2 of the transparent panel 126b are at least tilted with respect to active surface 122a of the light valve 122 in the stationary state. That is, a tilt angle θ exists between the transparent surfaces S1 and S2 of the transparent panel 126b in the stationary state with respect to the active surface 122a of the light valve 122. Therefore, when the illumination beam L1 from the light source module 110 is obliquely incident to the transparent surfaces S1 and S2 of the transparent panel 126b, a portion of the illumination beam (labeled L1' in FIG. 2) is reflected by the transparent surfaces S1 and S2 and is not transmitted to the light valve 122. Due to the tilted design of the transparent surfaces S and S2, the reflected portion of the illumination beam L' does not pass through the projection lens 124, and therefore the projection of stray light affecting imaging quality can be prevented.

Figure 5:
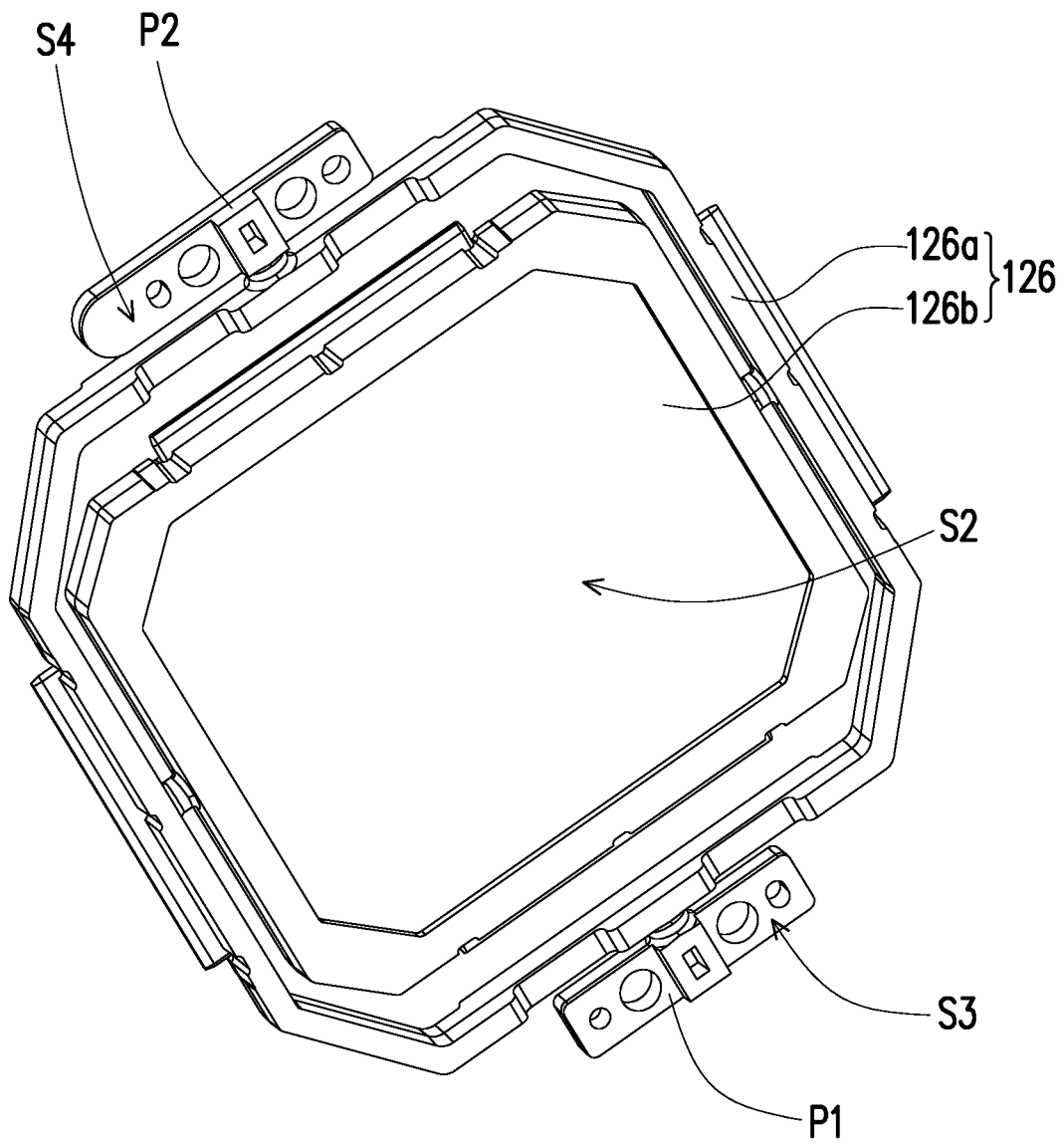
FIG. 5 is a three-dimensional view of the pixel offset device of FIG. 3 from another perspective.

FIG. 5 is a three-dimensional view of the pixel offset device of FIG. 3 from another perspective. Referring to FIG. 5, the frame 126a of the pixel offset device 126 includes two opposite positioning portions P1 and P2, and is positioned in the base 128 via the positioning portions P1 and P2. The positioning portion P1 has a positioning surface S3, the positioning portion P2 has a positioning surface S4, and the positioning surfaces S3 and S4 are configured to lean against the base 128. The positioning surface S3 and the positioning surface S4 are, for instance, parallel to the active surface 122a of the light valve 122 (shown in FIG. 4). That is, the transparent surfaces S1 and S2 of the transparent panel 126b are tilted to the positioning surfaces S3 and S4 of the frame 126a.

In the embodiment, the tilt angle θ of the transparent surfaces S1 and S2 of the transparent panel 126b with respect to the active surface 122a of the light valve 122 is, for instance, greater than 0 degrees and less than or equal to 5 degrees. That is, the tilt angle of the transparent surfaces S1 and S2 of the transparent panel 126b with respect to the positioning surfaces S3 and S4 of the frame 126a is, for instance, greater than 0 degrees and less than 5 degrees. If the tilt angle θ is greater than 5 degrees, then when the pixel offset device 126 vibrates, the function of increasing pixel resolution is lost. In other embodiments, the transparent surfaces S1 and S2 of the transparent panel 126b can be disposed to have other different tilt angles, and the invention is not limited in this regard.

Referring to FIG. 2, in the embodiment, the optical engine 120 further includes a light-absorbing heat dissipation component 129, and the illumination beam (labeled L1' in FIG. 2) reflected by the transparent surface S1 or the transparent surface S2 is, for instance, transmitted to the light-absorbing heat dissipation component 129 and absorbed to prevent the illumination beam from being unexpectedly reflected by other structures in the optical engine 120 and entering the projection lens 124. Moreover, referring to FIG. 2 and FIG. 4, the transparent surfaces S1 and S2 are, for instance, rotated toward the space above the active surface 122a in FIG. 2 with the long axis of the active surface 122a as the axis of rotation, or the transparent surfaces S1 and S2 are rotated toward the space above the active surface 122a in FIG. 2 with the diagonal of the active surface 122a as the axis of rotation to achieve the configuration in which the transparent surfaces S1 and S2 are tilted with respect to the active surface 122a. As a result, the illumination beam (labeled L1' in FIG. 2) reflected by the transparent surface S or S2 configured above can be guided to the light-absorbing heat dissipation component 129.

Figure 6:
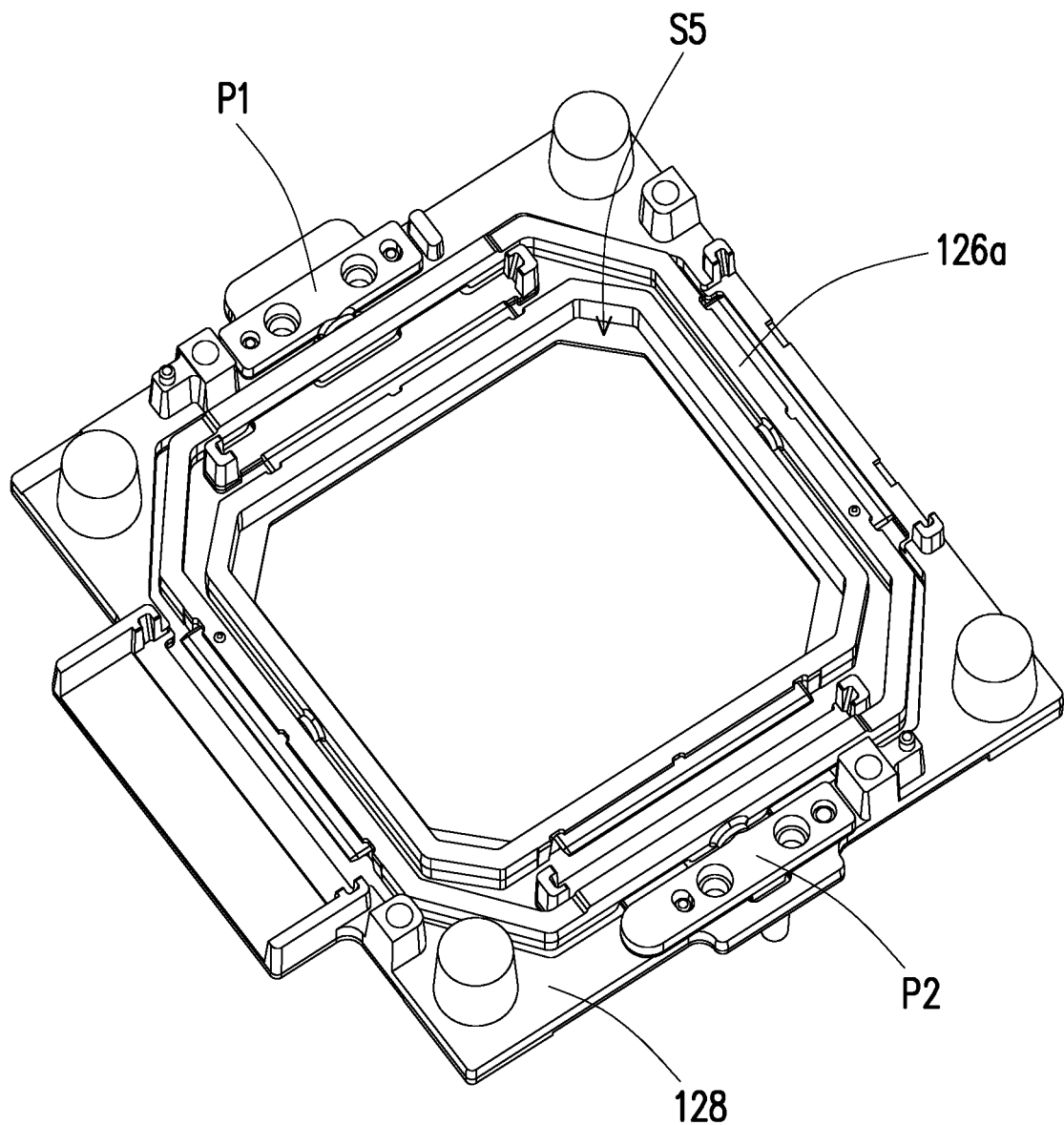
FIG. 6 is a three-dimensional view of the base and frame of FIG. 3.

FIG. 6 is a three-dimensional view of the base and frame of FIG. 3. In the embodiment, the frame 126a has at least one carrying surface S5 as shown in FIG. 6, and the carrying surface S5 is shown as a continuous annular surface in the embodiment. In other embodiments, the carrying surface S5 can be two surfaces at diagonally opposite corners on the frame to carry the transparent panel, but the invention is not limited thereto. The carrying surface S5 carries at least a portion of the periphery of the transparent panel 126b (shown in FIG. 4). The carrying surface S5 is, for instance, tilted with respect to the positioning surfaces S3 and S4 (shown in FIG. 5) and the active surface 122a (shown in FIG. 4) of the light valve 122 such that the transparent surfaces S1 and S2 of the transparent panel 126b placed on the carrying surface S5 are tilted with respect to the positioning surfaces S3 and S4 and the active surface 122a. In other embodiments, the transparent surfaces S and S2 of the transparent panel 126b can be tilted with respect to the positioning surfaces S3 and S4 and the active surface 122a via other methods exemplified below.

Figure 7:
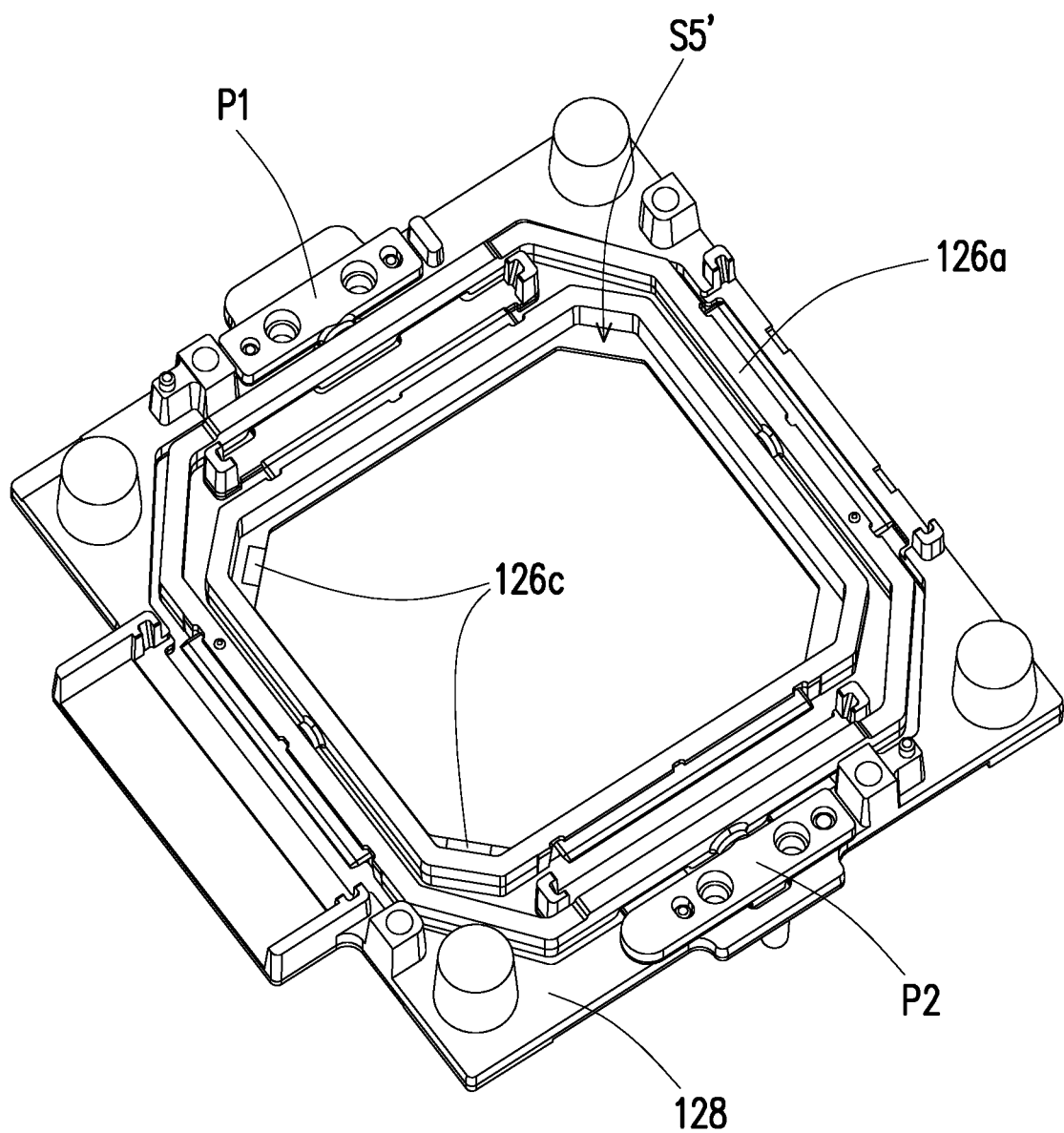
FIG. 7 is a three-dimensional view of the base and frame of another embodiment of the invention.

FIG. 7 is a three-dimensional view of the base and frame of another embodiment of the invention. The embodiment shown in FIG. 7 and the embodiment shown in FIG. 6 are different in that a carrying surface S5' of the frame 126b of FIG. 7 is not tilted with respect to the positioning surfaces S3 and S4 (shown in FIG. 5) and the active surface 122a (shown in FIG. 4), but is parallel to the positioning surfaces S3 and S4 (shown in FIG. 5) and the active surface 122a (shown in FIG. 4). Instead, the pixel offset device of the embodiment shown in FIG. 7 further includes at least one gasket 126c (shown as two), and the gasket 126c is disposed between the carrying surface S5' and the transparent panel (same as the transparent panel 126b shown in FIG. 3) such that the transparent surfaces S and S2 of the transparent panel 126b are tilted with respect to the positioning surfaces S3 and S4 and the active surface 122a.

Figure 8:
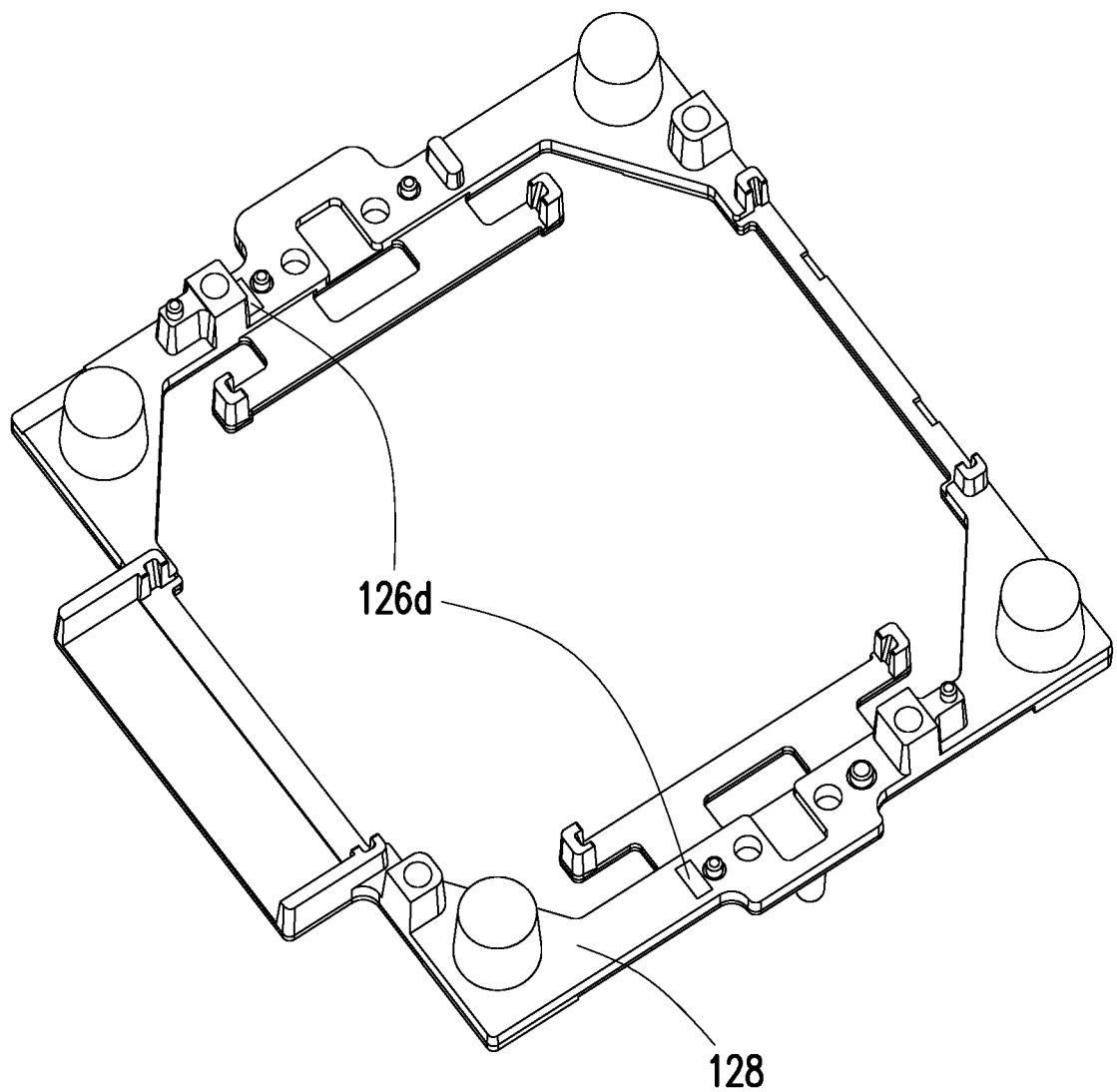
FIG. 8 is a three-dimensional view of the base of another embodiment of the invention.

FIG. 8 is a three-dimensional view of the base of another embodiment of the invention. The embodiment shown in FIG. 8 and the embodiment shown in FIG. 7 are different in that in the embodiment shown in FIG. 8, the transparent surfaces S1 and S2 of the transparent panel 126b are not tilted via the gasket 126c shown in FIG. 7. The pixel offset device of the embodiment shown in FIG. 8 includes at least one gasket 126d (shown as two), and the gasket 126d is disposed between the base 128 and the positioning portions of the frame (such as the positioning portions P1 and P2 of the frame 126a shown in FIG. 7) such that the transparent surfaces S1 and S2 of the transparent panel 126b (such as the transparent panel 126b shown in FIG. 3) are tilted with respect to the positioning surfaces S3 and S4 and the active surface 122a.

Based on the above, the embodiments of the invention have at least one of the following advantages or efficacies. The transparent surface of the transparent panel of the pixel offset device is tilted with respect to the active surface of the light valve, and therefore when a portion of the illumination beam from the light source module is reflected by the transparent surface of the transparent panel, the reflected illumination beam is not transmitted toward the projection lens due to the tilted design of the transparent surface to prevent the generation of stray light.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector, comprising:
    a light source module, configured to provide an illumination beam; and
    an optical engine, comprising:
        a light valve, disposed on a transmission path of the illumination beam, wherein the light valve has an active surface, and the active surface is configured to convert the illumination beam into an image beam and reflect deflect the image beam in a predefined direction for projecting the image beam;
        a projection lens, disposed on a transmission path of the image beam, having an optical axis parallel to the predefined direction, and configured to project the image beam;
        a pixel offset device, located between the light valve and the projection lens, wherein the pixel offset device comprises a frame and a transparent panel, the transparent panel comprises a transparent surface, the frame has at least one carrying surface, the carrying surface of the frame carries at least a portion of a periphery of the transparent panel, the carrying surface is tilted with respect to the active surface such that the transparent surface is tilted with respect to the active surface, the transparent panel is disposed on the transmission path of the illumination beam and the transmission path of the image beam, and the frame is configured to drive the transparent panel to vibrate, wherein when the pixel offset device is in a stationary state, a tilt angle exists between the transparent surface and the active surface,
    wherein after a portion of the illumination beam passes through the transparent surface of the pixel offset device, the portion of the illumination beam is transmitted to the light valve and converted into the image beam by the light valve, and after the image beam is deflected by the light valve in the predefined direction, the image beam passes through the transparent surface of the pixel offset device and is further transmitted to the projection lens; and
    a light-absorbing heat dissipation component, configured to absorb another portion of the illumination beam deflected by the transparent surface of the pixel offset device, so that the deflected another portion of the illumination beam does not transmit, to the projection lens, wherein the another portion of the illumination beam does not pass through the projection lens.

2. The projector of claim 1, wherein the projector is a non-telecentric architecture.

3. The projector of claim 1, wherein the tilt angle of the transparent surface with respect to the active surface is greater than 0 degrees and less than or equal to 5 degrees.

4. An optical engine configured to a projector, wherein the projector further comprises a light source module configured to provide an illumination beam, and the optical engine comprising:
    a light valve disposed on a transmission path of the illumination beam, wherein the light valve has an active surface, and the active surface is configured to convert the illumination beam into an image beam and reflect deflect the image beam in a predefined direction for projecting the image beam;
    a projection lens disposed on a transmission path of the image beam, having an optical axis parallel to the predefined direction, and configured to project the image beam;
    a pixel offset device located between the light valve and the projection lens, wherein the pixel offset device comprises a frame and a transparent panel, the transparent panel comprises a transparent surface, the frame has at least one carrying surface, the carrying surface of the frame carries at least a portion of a periphery of the transparent panel, the carrying surface is tilted with respect to the active surface such that the transparent surface is tilted with respect to the active surface, the transparent panel is disposed on the transmission path of the illumination beam and the transmission path of the image beam, and the frame is configured to drive the transparent panel to vibrate, wherein when the pixel offset device is in a stationary state, a tilt angle exists between the transparent surface and the active surface, wherein after a portion of the illumination beam passes through the transparent surface of the pixel offset device, the portion of the illumination beam is transmitted to the light valve and converted into the image beam by the light valve, and after the image beam is deflected by the light valve in the predefined direction, the image beam passes through the transparent surface of the pixel offset device and is further transmitted to the projection lens; and a light-absorbing heat dissipation component, configured to absorb another portion of the illumination beam deflected by the transparent surface of the pixel offset device, so that the deflected another portion of the illumination beam does not transmit, to the projection lens, wherein the another portion of the illumination beam does not pass through the projection lens.

5. The optical engine of claim 4, wherein the tilt angle of the transparent surface with respect to the active surface is greater than 0 degrees and less than or equal to 5 degrees.

\* \* \* \* \*